(12) United States Patent
Gandhi

(10) Patent No.: US 9,729,698 B2
(45) Date of Patent: Aug. 8, 2017

(54) INCREASING USER MEMORY SPACE ON END-OF-LIFE MOBILE USER DEVICES

(71) Applicant: Verizon Patent and Licensing Inc., Arlington, VA (US)

(72) Inventor: Niraj Gandhi, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 262 days.

(21) Appl. No.: 14/641,916

(22) Filed: Mar. 9, 2015

(65) Prior Publication Data
US 2016/0269537 A1    Sep. 15, 2016

(51) Int. Cl.
| | |
|---|---|
| *H04M 1/725* | (2006.01) |
| *H04W 4/12* | (2009.01) |
| *H04L 29/08* | (2006.01) |
| *H04M 3/42* | (2006.01) |
| *G06F 9/445* | (2006.01) |

(52) U.S. Cl.
CPC .......... *H04M 1/72563* (2013.01); *G06F 8/65* (2013.01); *H04L 67/22* (2013.01); *H04M 3/42144* (2013.01); *H04W 4/12* (2013.01)

(58) Field of Classification Search
CPC ..... H04W 8/245; H04W 24/02; H04W 88/02; H04W 4/12; H04M 1/72525; H04M 1/72522; H04M 3/42144; H04M 1/72563; H04L 67/22
See application file for complete search history.

(56) References Cited

U.S. PATENT DOCUMENTS

| | | | | |
|---|---|---|---|---|
| 9,042,877 | B1 * | 5/2015 | Ghoshal ................ | H04W 8/245 455/418 |
| 2009/0094603 | A1 * | 4/2009 | Hiltgen ................. | G06F 9/4406 718/1 |

* cited by examiner

*Primary Examiner* — Ted Wang

(57) ABSTRACT

A device provides, to a mobile user device, an instruction to increase a partition of a memory of the mobile user device, based on a determination that the mobile user device will not receive future software updates. The partition of the memory is accessible to a user of the mobile user device. The instruction causes the mobile user device to increase a storage space for the partition by a particular amount, and generate an indication of the increased partition. The device receives the indication of the increased partition.

20 Claims, 12 Drawing Sheets

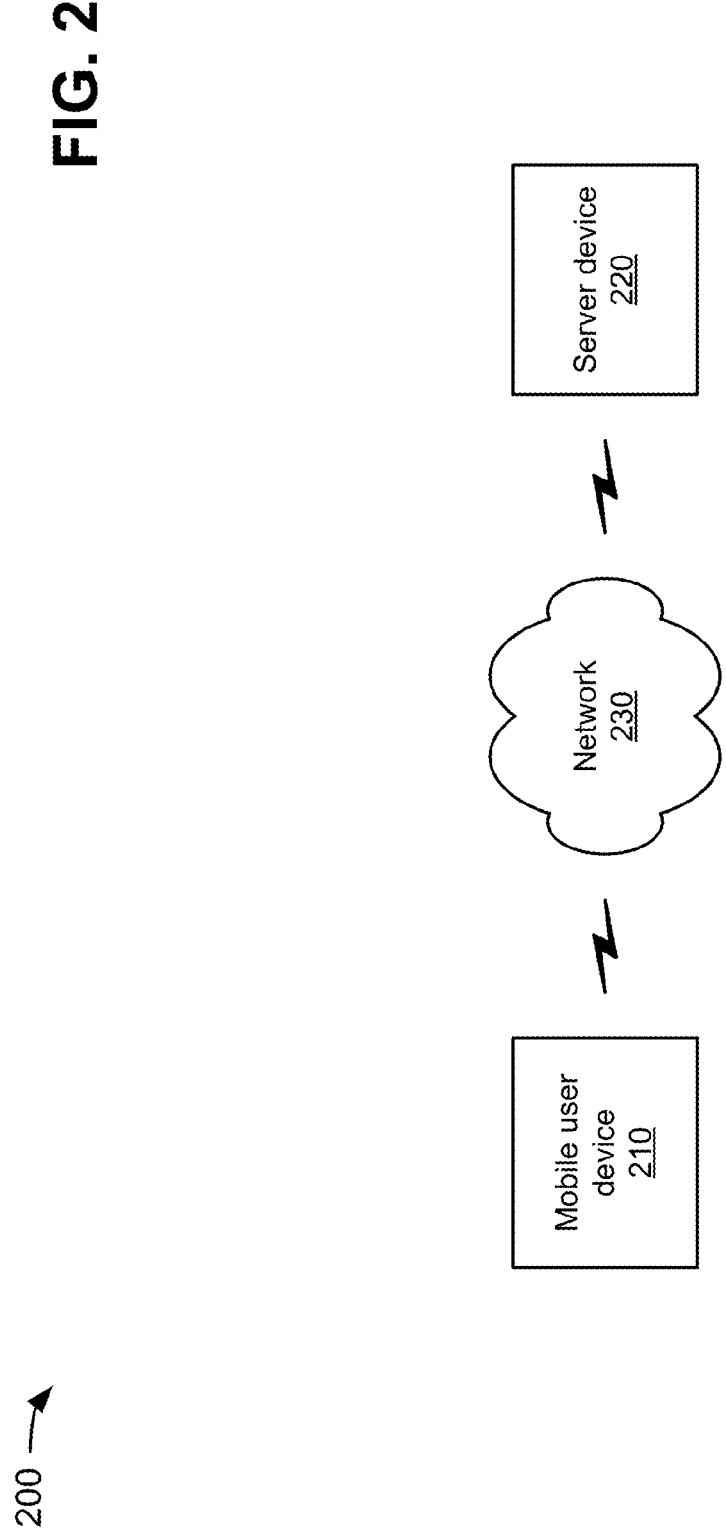

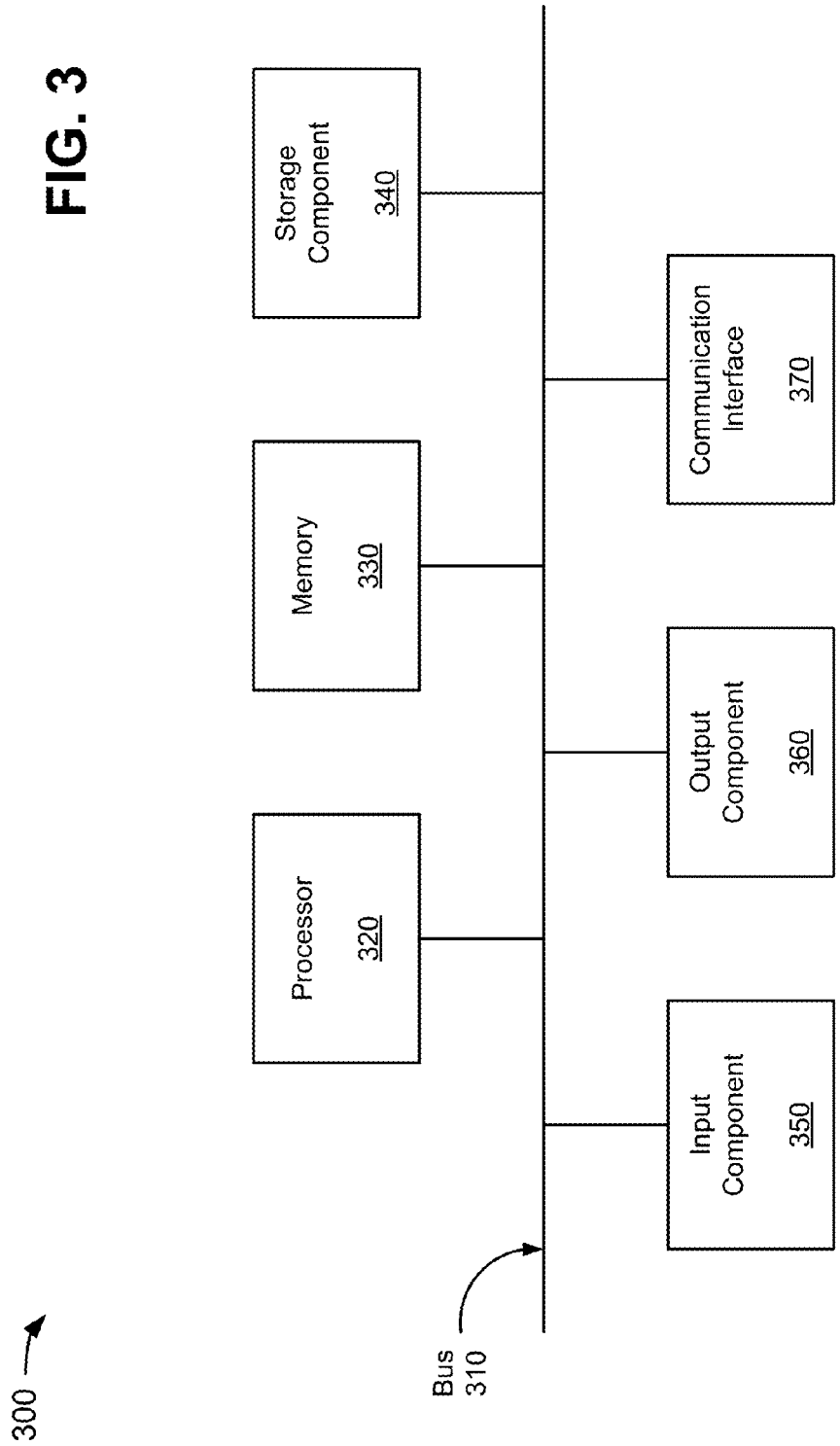

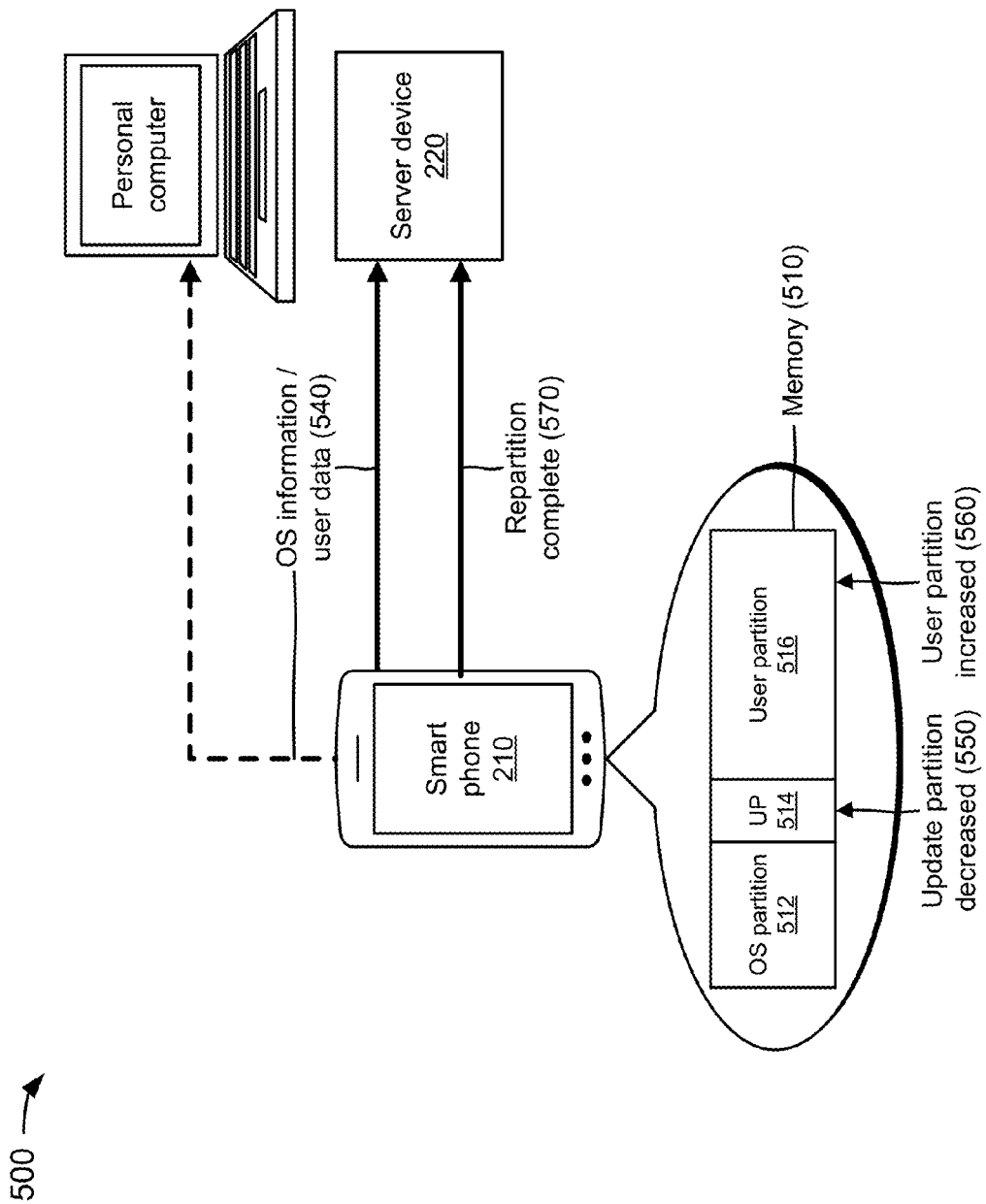

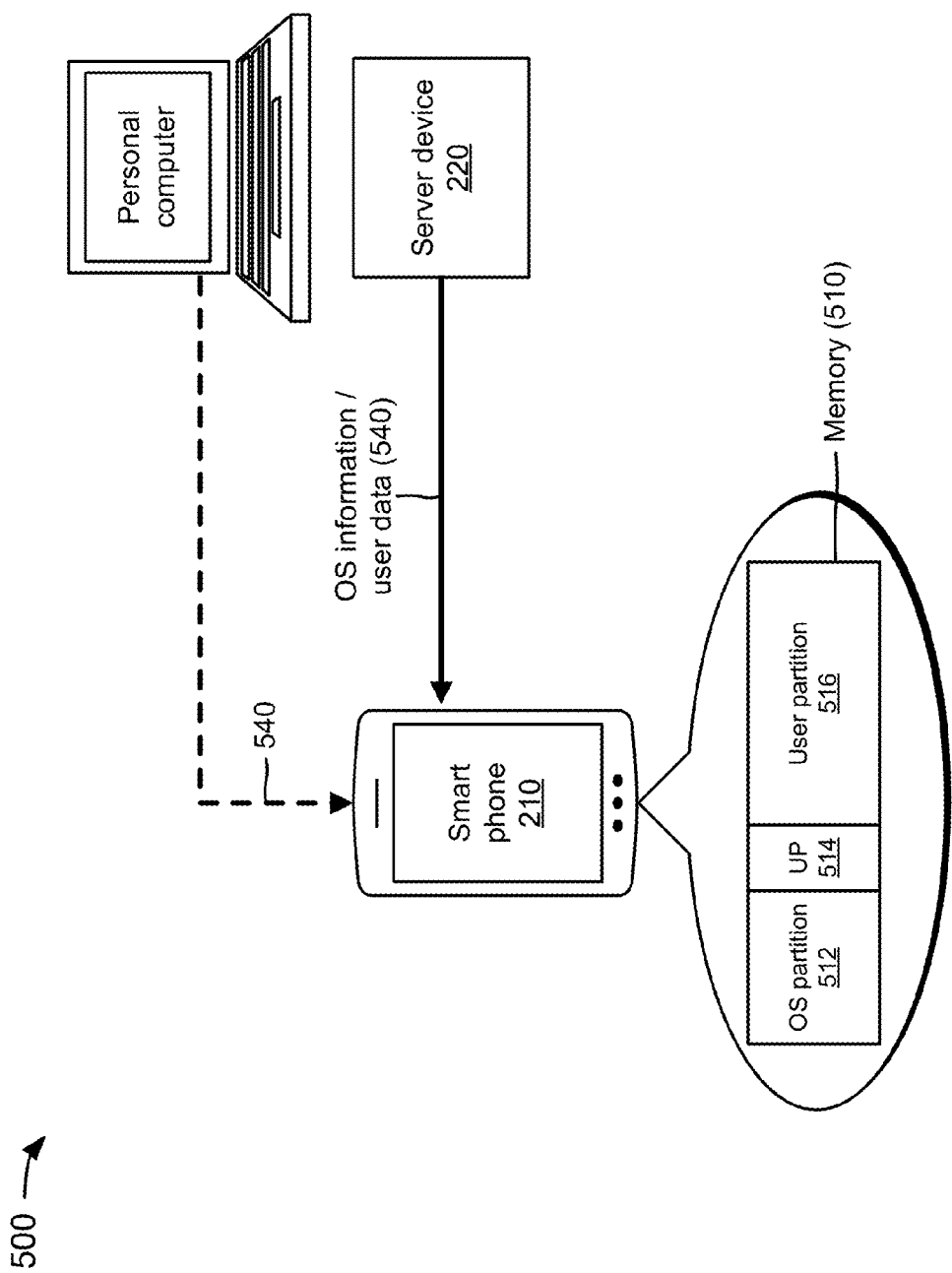

INCREASING USER MEMORY SPACE ON END-OF-LIFE MOBILE USER DEVICES

BACKGROUND

Users today utilize a variety of mobile user devices, such as cell phones, smart phones, tablet computers, or the like, to access online services (e.g., email applications, Internet services, television services, or the like), purchase products and/or services, and/or perform other tasks via networks. A mobile user device may be actively managed by a network service provider and kept current by providing software updates, as required, for the life of the mobile user device. Some network service providers provide a particular number of major operating system (OS) upgrades during the life of the mobile user device, which may be generally up to two years. The network service providers may provide the major operating system upgrades to all mobile user devices associated with the network service providers, irrespective of operating systems, types of mobile user devices (e.g., smart phone, tablet computer, or the like), amounts of memory, or the like.

BRIEF DESCRIPTION OF THE DRAWINGS

FIG. 2 is a diagram of an example environment in which systems and/or methods, described herein, may be implemented;

FIG. 3 is a diagram of example components of a device that may correspond to one or more of the devices of the environment depicted in FIG. 2;

FIGS. 5A-5C are diagrams of an example relating to the example process shown in FIG. 4;

DETAILED DESCRIPTION OF PREFERRED EMBODIMENTS

The following detailed description refers to the accompanying drawings. The same reference numbers in different drawings may identify the same or similar elements.

Over time, a user may obtain and store content, such as applications, media (e.g., music files, images, video files, or the like), and/or other files, in memory provided in the user's mobile user device. Eventually, however, the storage space of the memory may become filled with the user's content. At this point, if the user wishes to store new content in the memory, the user has to delete some content from the memory so that the new content may be stored in the memory. Furthermore, the entire storage space of the mobile user device's memory is not dedicated entirely to the user's content. For example, a portion of the storage space is reserved for an operating system, a recovery partition, a partition for updates to the operating system, and/or one or more other partitions required by the operating system, a manufacturer of the mobile user device, and/or the network service provider. Thus, if the memory of the mobile user device includes a storage space of sixteen (16) gigabytes (GB), the user may have access to about ten (10) or eleven (11) GB of the storage space for the user's content.

Systems and/or methods, described herein, may increase a storage space of a memory of a mobile user device, allotted to user content, after a particular time or a particular event. For example, the systems and/or methods may increase the storage space allotted to user content after the mobile user device is determined to be an end-of-life (EOL) or obsolete device (e.g., after a particular number of months, years, or the like, when the mobile user device is no longer available, or the like); at a time determined by the network service provider (e.g., when mobile user device will not receive any more operating system upgrades and a large amount of memory need not be reserved to store software update packages); or the like. The systems and/or methods may increase the storage space allotted to user content when the network service provider ceases sending software (e.g., operating system) updates to the mobile user device. Thus, the systems and/or methods may enable a user to store additional user content on the mobile user device without having to delete previously stored user content to make room for the additional user content.

Figure 1A:
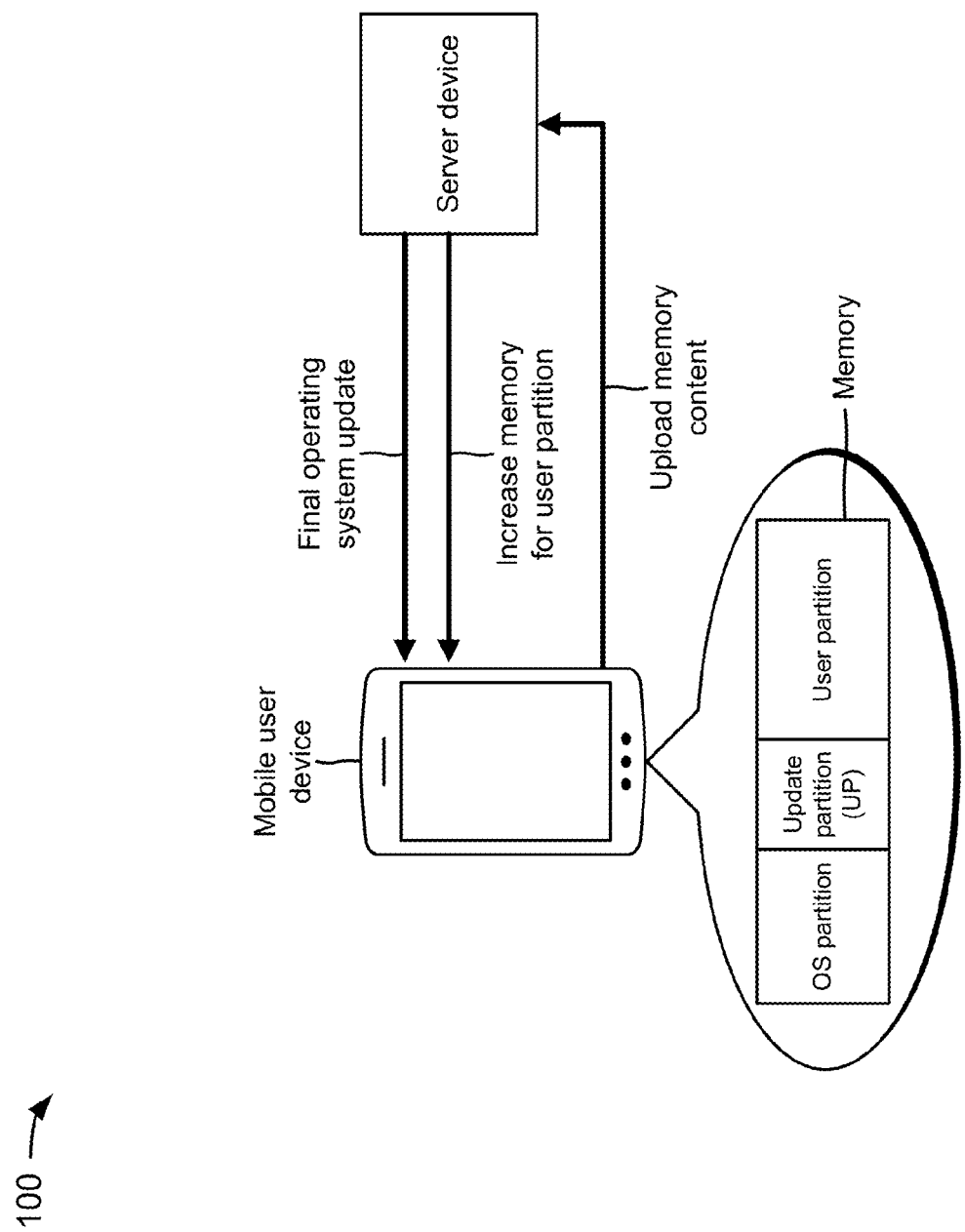
FIGS. 1A and 1B are diagrams of an overview of an example implementation described herein.
Figure 1B:
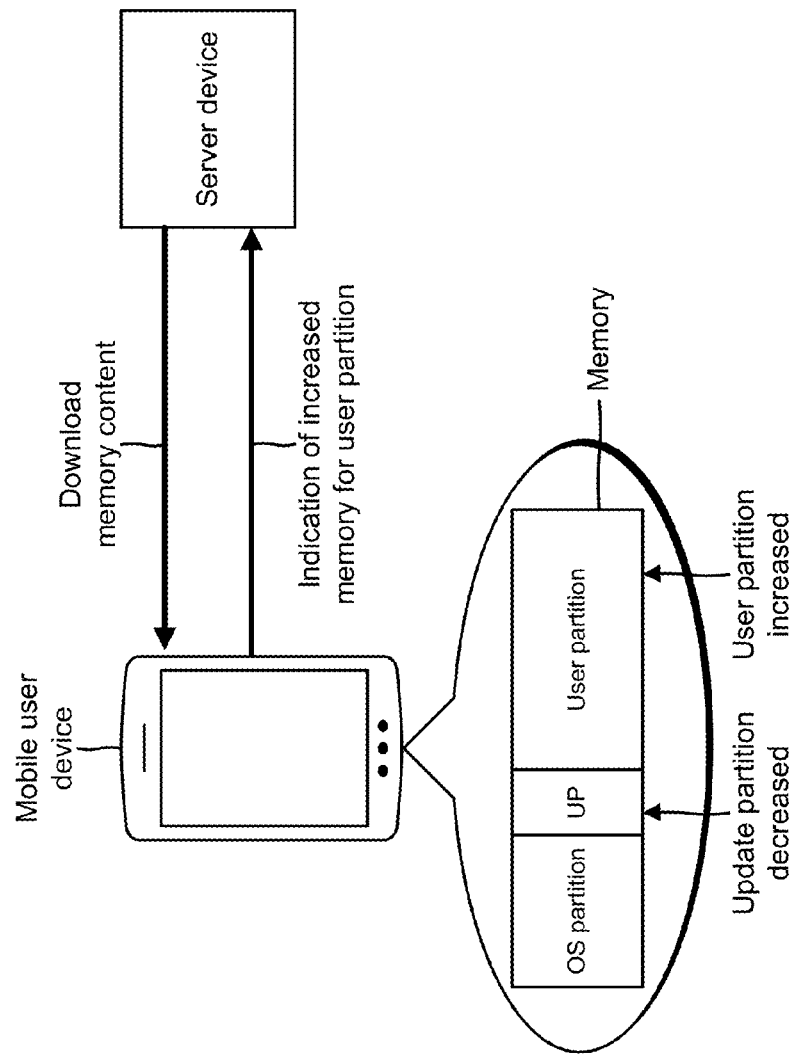

FIGS. 1A and 1B are diagrams of an overview of an example implementation 100 described herein. As shown in FIG. 1A, assume that a mobile user device (e.g., a smart phone, a tablet computer, a notebook computer, or the like) includes a memory with storage space that is divided or mapped into partitions. Further, assume that the storage space includes a partition for storing an operating system (OS) (e.g., an OS partition), a partition for storing software updates (e.g., an update partition), and a partition for storing user content (e.g., a user partition). The mobile user device may be associated with a network (not shown) managed by a network service provider.

As further shown in FIG. 1A, a server device associated with the network service provider may provide a final major software update (e.g., a final OS update) to the mobile user device, and the mobile user device may store the final OS update in the update partition. The mobile user device may utilize the final OS update to update the OS stored in the OS partition, and may remove the final OS update from the update partition. After providing the final OS update to the mobile user device, the server device may determine that the mobile user device will not be provided future OS updates, and may provide, to the mobile user device, an instruction to increase the memory (e.g., storage space) for the user partition. Based on the instruction, the mobile user device may upload the content of memory (e.g., the OS, the content of the user partition, or the like), to the server device, as further shown in FIG. 1A.

After uploading the memory content to the server device, the mobile user device may reparation the memory to increase the storage space for the user partition, as shown in FIG. 1B. For example, the mobile user device may decrease the storage space allotted to the update partition by a particular amount, and may increase the storage space allotted to the user partition by the particular amount. After increasing the storage space for the user partition, the mobile user device may provide, to the server device, an indication of the increased storage space for the user partition. The server device may download the memory content to the mobile user device based on the indication, as further shown in FIG. 1B. The mobile user device may receive the memory content, and may repopulate the memory with the memory content. For example, the mobile user device may provide the OS in the OS partition, and may provide user content in the increased storage space of the user partition.

Systems and/or methods, described herein, may increase a storage space of a mobile user device's memory, allotted to user content, after a particular time or a particular event, so that a user may store additional user content on the mobile user device.

FIG. 2 is a diagram of an example environment 200 in which systems and/or methods, described herein, may be implemented. As illustrated, environment 200 may include a mobile user device 210, a server device 220, and a network 230. Devices of environment 200 may interconnect via wired connections, wireless connections, or a combination of wired and wireless connections.

Mobile user device 210 may include a device that is capable of communicating over network 230 with server device 220. In some implementations, mobile user device 210 may include a radiotelephone; a personal communications services (PCS) terminal that may combine, for example, a cellular radiotelephone with data processing and data communications capabilities; a smart phone; a notebook computer; a laptop computer; a tablet computer; or another type of mobile computation and communication device.

Server device 220 may include one or more personal computers, one or more workstation computers, one or more server devices, one or more virtual machines (VMs) provided in a cloud computing environment, or one or more other types of computation and communication devices. In some implementations, server device 220 may be associated with a network service provider that manages and/or operates network 230, such as, for example, a telecommunication service provider, a television service provider, an Internet service provider, or the like. In some implementations, server device 220 may determine that mobile user device 210 will not receive future operating system updates, and may provide, to mobile user device 210, an instruction to increase storage space for a user partition of a memory. Server device 220 may receive memory content from mobile user device 210 based on the instruction, and mobile user device 210 may repartition the memory to increase the storage space for the user partition. Server device 220 may receive, from mobile user device 210, an indication of the increased storage space for the user partition, and may provide the memory content to mobile user device 210 based on the indication.

Network 230 may include one or more wired and/or wireless networks. For example, network 230 may include a cellular network (e.g., a long term evolution (LTE) network, a 3G network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300. Device 300 may correspond to mobile user device 210 and/or server device 220. In some implementations, mobile user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. In some implementations, processor 320 may include a processor (e.g., a central processing unit (CPU), a graphics processing unit (GPU), an accelerated processing unit (APU), or the like), a microprocessor, and/or any processing component (e.g., a field-programmable gate array (FPGA), an application-specific integrated circuit (ASIC), or the like) that interprets and/or executes instructions. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
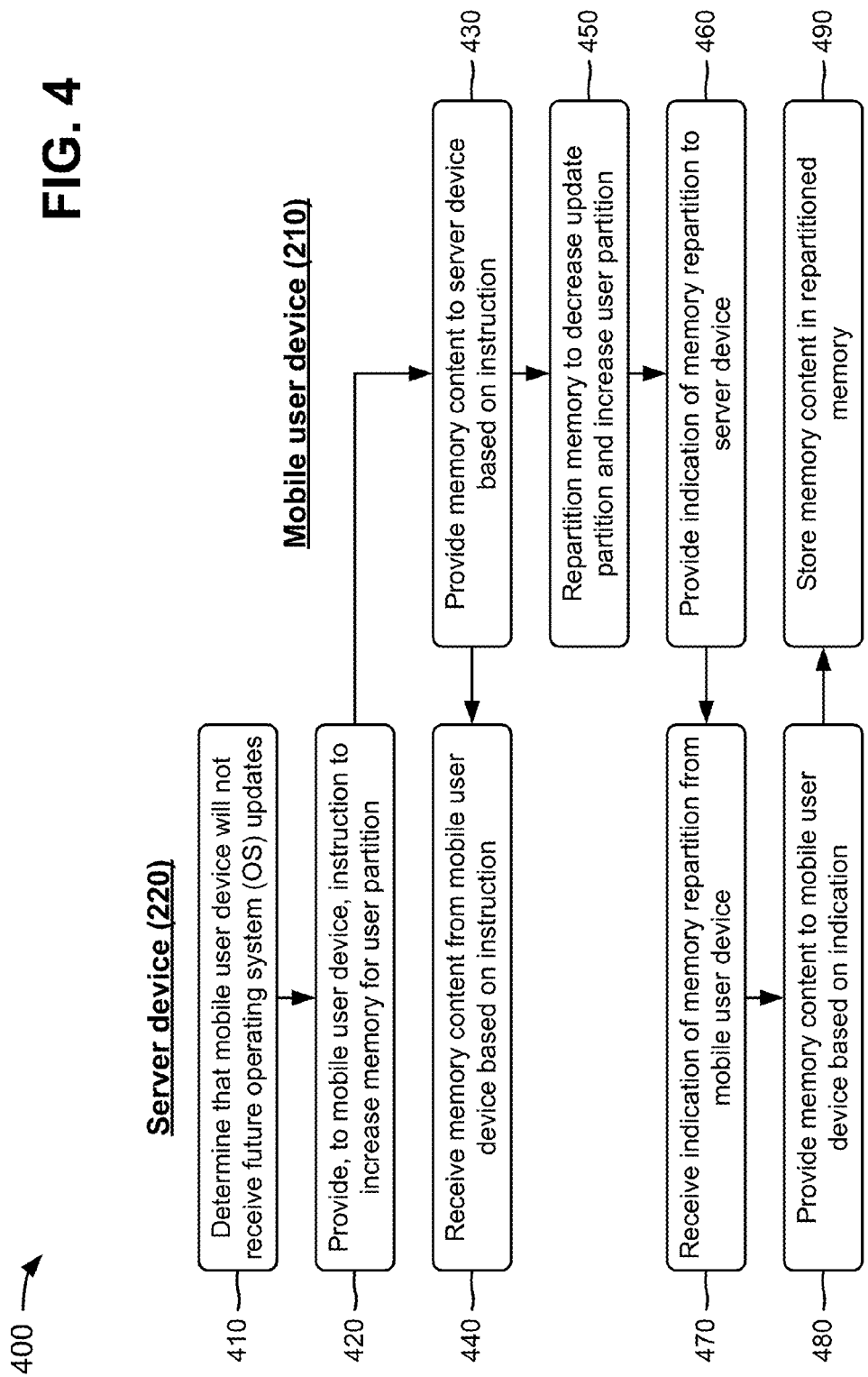
FIG. 4 is a flow chart of an example process for increasing user memory space on end-of-life mobile user devices.

FIG. 4 is a flow chart of an example process 400 for increasing user memory space on end-of-life mobile user devices. In some implementations, one or more process blocks of FIG. 4 may be performed by mobile user device 210 and/or server device 220. In some implementations, one or more process blocks of FIG. 4 may be performed by another device or a group of devices separate from or including mobile user device 210 and/or server device 220.

As shown in FIG. 4, process 400 may include determining that a mobile user device will not receive future operating system (OS) updates (block 410). For example, server device 220 may determine that mobile user device 210 will not receive future operating system updates. In some implementations, server device 220 may determine that mobile user device 210 will not receive future operating system updates after a particular event occurs. For example, server device 220 may provide a particular number (e.g., two, three, or the like) of operating system updates to mobile user device 210, and the particular event may correspond to when server device 220 provides the particular number of operating system updates to mobile user device 210. In some implementations, server device 220 may determine that mobile user device 210 will not receive future operating system updates after a particular time occurs. For example, the particular time may correspond to a number of months, years, or the like after mobile user device 210 (e.g., a particular model, device type, or the like) is purchased, available for sale, used with network 230, or the like. In another example, the particular time may correspond to an end-of-life (EOL) of mobile user device 210 (e.g., a number of months, years, or the like after a network service provider stops selling mobile user device 210).

In some implementations, a network service provider (e.g., via server device 220) may cease providing operating system updates and other software updates to mobile user device 210, after the particular event and/or the particular time. For example, the network service provider may cease providing operating system and/or other software updates to mobile user device 210 at an end-of-life of mobile user device 210 (e.g., two or more years after the network service provider stops selling mobile user device 210). In some implementations, the network service provider (e.g., via server device 220) may provide operating system and/or other software updates to mobile user device 210 (e.g., after the particular event and/or the particular time) if required to correct an issue with network 230, a security issue, and/or another type of issue.

As further shown in FIG. 4, process 400 may include providing, to the mobile user device, an instruction to increase memory for a user partition (block 420). For example, after determining that mobile user device 210 will not receive future operating system updates, server device 220 may provide, to mobile user device 210, an instruction to increase memory (e.g., storage space) for a user partition of a memory provided in mobile user device 210. In some implementations, server device 220 may generate the instruction after determining that mobile user device 210 will not receive future operating system updates, and may provide the instruction to mobile user device 210. In such implementations, server device 220 may generate the instruction after a final operating system update is provided to mobile user device 210. In some implementations, server device 220 may include the instruction in the final operating system update provided to mobile user device 210. In such implementations, server device 220 may generate the instruction before the final operating system update is provided to mobile user device 210.

In some implementations, mobile user device 210 may include a memory with storage space that is divided or mapped into partitions (e.g., smaller portions of memory) for security and various other reasons. For example, the storage space may include a partition for storing an operating system (e.g., an OS partition), a partition for storing operating system and/or other software updates (e.g., an update partition), a partition for storing user content (e.g., a user partition), or the like. In some implementations, one or more partitions (e.g., the OS partition and the update partition) may be hidden from a user of mobile user device 210 and reserved for operating system and/or other system use.

In some implementations, the update partition may include memory reserved for a device management client to store software updates (e.g., files) received from a device management server (e.g., server device 220). Since the update partition cannot be used by system files and/or user content, mobile user device 210 may guarantee that a software update will not fail due to insufficient storage space for the software update. In some implementations, a storage space size of the update partition may be determined by a manufacturer of mobile user device 210 and may be sized to accommodate at least a particular number (e.g., two, three, or the like) of operating system updates. For example, the update partition may include a storage space size of one (1) GB, two (2) GB, or the like. In some implementations, a network service provider may actively manage and upgrade mobile user device 210 by sending software updates for storage in the update partition. In some implementations, after mobile user device 210 receives a final operating system update, the update partition may be empty and unused by mobile user device 210.

In some implementations, server device 220 may generate a user interface that provides a user with an option to accept or deny the repartition of the memory of mobile user device 210. In some implementations, the user interface may be displayed to the user by mobile user device 220, a personal computer, a tablet computer, a set-top box, or the like, associated with the user. In some implementations, the user interface may be displayed before the end of life of mobile user device 210, near the end of life of mobile user device 210, or the like. In some implementations, the user interface may be provided to the user when an amount of stored content in mobile user device 210 is greater than a particular threshold. In some implementations, the user interface may not be provided to the user when the amount of stored content in mobile user device 210 is less than the particular threshold or another threshold.

As further shown in FIG. 4, process 400 may include providing memory content to a server device based on the instruction (block 430). For example, mobile user device 210 may provide content of the memory of mobile user device 210 to server device 220 based on the instruction to increase memory for the user partition. In some implementations mobile user device 210 may provide content of the operating system partition, the user partition, and/or one or more other partitions of the memory to server device 220 based on the instruction. In some implementations, the content of the memory may include the operating system, applications, media (e.g., music files, images, video files, or the like), and/or other files.

In some implementations, mobile user device 210 may increase storage space for the user partition without repartitioning the memory of mobile user device 210. In some implementations, mobile user device 210 may provide the memory content (e.g., the operating system, the applications, the media, or the like) to a recovery partition of the memory. In such implementations, mobile user device 210 may not provide the memory content to server device 220.

As further shown in FIG. 4, process 400 may include receiving the memory content from the mobile user device based on the instruction (block 440). For example, server device 220 may receive the memory content from mobile user device 210 based on the instruction to increase memory for the user partition. In some implementations, server device 220 may store the memory content (e.g., in memory 330 and/or storage component 340, FIG. 3). In some implementations, the memory content of mobile user device 210 may be provided to and stored by a device other than server device 220, such as a cloud computing device, a personal computer connected to (and co-located with) mobile user device 210, or the like.

In some implementations, mobile user device 210 may increase storage space for the user partition without repartitioning the memory of mobile user device 210, or may provide the memory content to a recovery partition of the memory. In such implementations, mobile user device 210 may not provide the memory content to server device 220, and server device 220 may not receive the memory content.

As further shown in FIG. 4, process 400 may include repartitioning the memory to decrease an update partition and increase the user partition (block 450). For example, based on the instruction, mobile user device 210 may repartition the memory to decrease a storage space used for the update partition and increase a storage space used the user partition of the memory. In some implementations, mobile user device 210 may repartition the memory by reconfiguring the memory map to reduce the storage space allotted to the update partition by a particular amount (e.g., in percent, in GB, or the like) and to increase the storage space allotted to the user partition by the particular amount.

In some implementations, after being set in a boot loader mode, mobile user device 210 may reduce an original size of the user partition (e.g., by a particular percentage) to create additional storage space in the memory. In such implementations, mobile user device 210 may release the additional storage space to the user as a new partition or may add the additional storage space to the existing user partition. Thus, the user may have access to extra space for storing user content, and the network service provider may still have the capability to send out a software update, if needed. In some implementations, mobile user device 210 may also receive software updates via personal computer-based or desktop-based software update tools.

In some implementations, mobile user device 210 may not create a separate partition for the update partition when a memory map is initially created for mobile user device 210. In such implementations, mobile user device 210 may add a portion of storage space to be reserved for software updates to the user partition. For example, mobile user device 210 may create a folder in the user partition, and may add a temporary file in the folder. The temporary file may be sized to match the size of the portion of storage space to be reserved for software updates. The folder and the temporary file may include permissions such that only a device management client can see and use the folder and the temporary file, and such that the folder is hidden from the user. During a software update, the device management client may delete the temporary file in the folder, and may store the software update in the folder. After the software update is complete, the device management client may recreate the temporary file with a size identified in the software update. In some implementations, to increase the storage space for the user partition, mobile user device 210 may reduce the size (e.g., from an original size) of the temporary file to create additional storage space, and may release the additional storage space to the user partition. For example, mobile user device 210 may modify the permissions such that the user partition may see and access the additional storage space.

In some implementations, mobile user device 210 may create an additional data partition (e.g., with a storage space that is small compared to the storage space of the memory) when a memory map is initially created for mobile user device 210. The additional data partition may include permissions such that the additional data partition is hidden from the user. In some implementations, the additional data partition may be in addition to the other partitions of memory, including the update partition. In some implementations, to increase the storage space for the user partition, mobile user device 210 may reduce the storage space allotted to the update partition by a particular amount, and may increase the storage space allotted to the additional data partition by the particular amount. In such implementations, mobile user device 210 may modify the permissions such that the enlarged additional data partition may be visible to and usable by the user. In some implementations, mobile user device 210 may execute a process or an application that enables the operating system to utilize the additional data partition for storing downloaded and/or pre-installed applications. In some implementations, if mobile user device 210 is set to check-in with server device 220 at a particular time interval in order to receive software updates, a final software update may remove the check-in or increase the particular time interval. This may reduce traffic on network 230, but may still allow the user to manually perform software update checks.

As further shown in FIG. 4, process 400 may include providing an indication of the memory repartition to the server device (block 460). For example, after repartitioning the memory to increase the user partition, mobile user device 210 may generate an indication that the memory has been repartitioned. In some implementations, mobile user device 210 may provide the indication to server device 220. In some implementations, the indication may indicate that the storage space for the user partition has been increased. In some implementations, mobile user device 210 may not generate the indication, and server device 220 may determine that the memory has been repartitioned after a particular time period (e.g., in seconds, minutes, or the like).

As further shown in FIG. 4, process 400 may include receiving the indication of the memory repartition from the mobile user device (block 470). For example, server device 220 may receive the indication of the memory repartition from mobile user device 210. In some implementations, if server device 220 does not receive the indication, server device 220 may determine that the memory of mobile user device 210 has been repartitioned after a particular time period.

As further shown in FIG. 4, process 400 may include providing the memory content to the mobile user device based on the indication (block 480). For example, server device 220 may provide the memory content to mobile user device 210 based on the indication or after the particular time period. In some implementations, server device 220 may retrieve (e.g., from memory 330 and/or storage component 340, FIG. 3) the memory content previously received from mobile user device 210, and may provide the memory content to mobile user device 210. In some implementations, if the memory content was previously provided to a cloud computing device or a personal computer, the cloud computing device or the personal computer may provide the memory content to mobile user device 210 (e.g., based on the indication and/or at the instruction of server device 220).

As further shown in FIG. 4, process 400 may include storing the memory content in the repartitioned memory (block 490). For example, mobile user device 210 may receive the memory content from server device 220, and may store the memory content in the repartitioned memory of mobile user device 210. In some implementations, mobile user device 210 may store the memory content in the operating system partition, the user partition, and/or one or more other partitions of the repartitioned memory.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
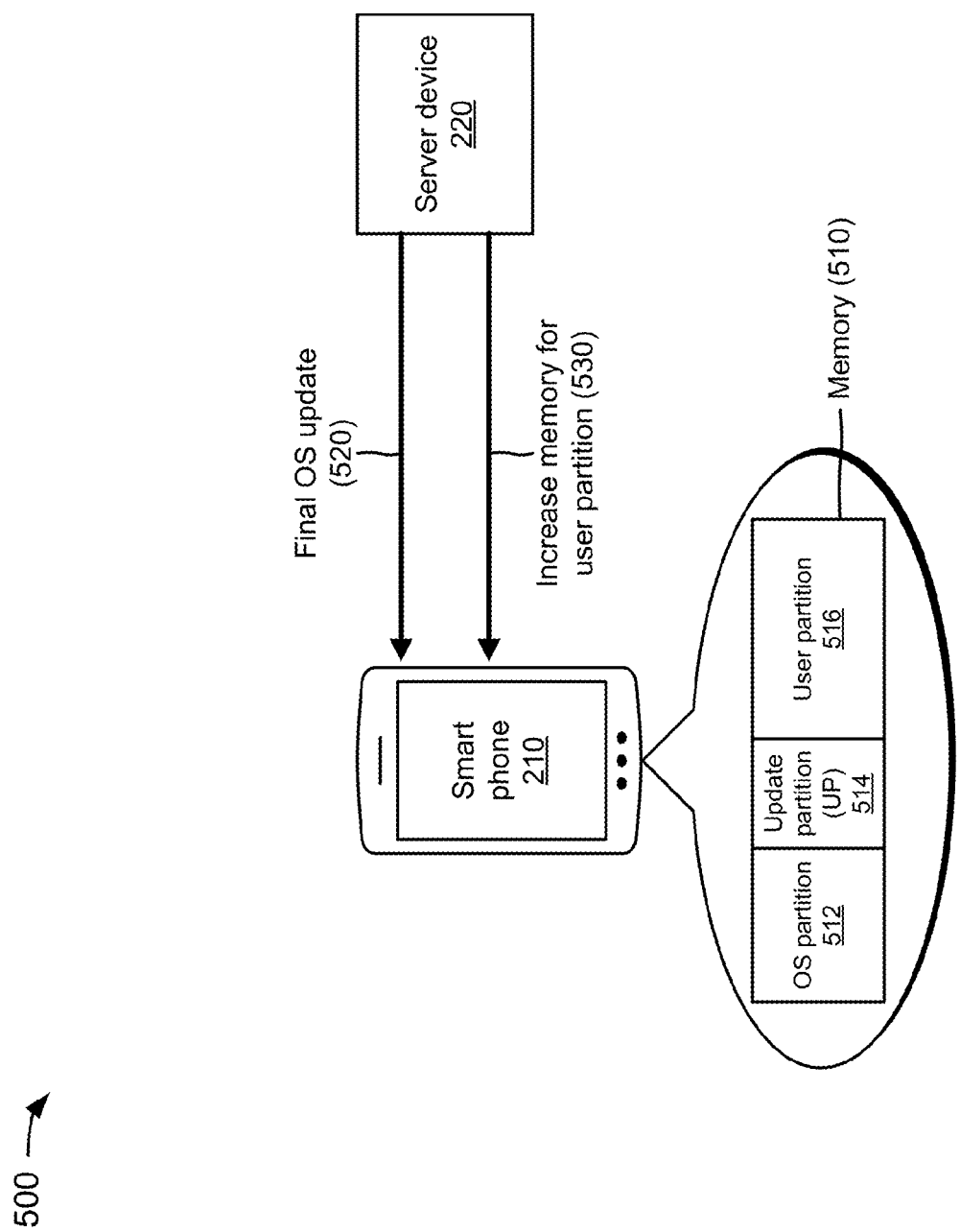

FIGS. 5A-5C are diagrams of an example 500 relating to example process 400 shown in FIG. 4. As shown in FIG. 5A, assume that mobile user device 210 includes a smart phone, and that smart phone 210 includes a memory 510. Further, assume that memory 510 includes an operating system (OS) partition 512, an update partition (UP) 514, and a user partition 516. As further shown in FIG. 5A, server device 220 may provide a final operating system (OS) update 520 to smart phone 210. Smart phone 210 may receive final OS update 520, and may store final OS update 520 in update partition 514. In some implementations, smart phone 210 may install final OS update 520, and may remove final OS update 520 from update partition 514. After providing final OS update 520 to smart phone 210, server device 220 may determine that no future software updates will be provided to smart phone 210. Based on this determination, server device 220 may provide, to smart phone 210, an instruction 530 to increase memory for user partition 516, as further shown in FIG. 5A.

As shown in FIG. 5B and based on instruction 530, smart phone 210 may provide OS information and/or user data 540 from memory 510 (e.g., from OS partition 512 and/or user partition 516) to server device 220 or, optionally, to a personal computer. Server device 220 or the personal computer may temporarily store OS information/user data 540. Further based on instruction 530, smart phone 210 may repartition memory 510 so that storage space allotted to update partition 514 is decreased by a particular amount, as indicated by reference number 550, and storage space allotted to user partition 516 is increased by the particular amount, as indicated by reference number 560. As further shown in FIG. 5B, after smart phone 210 reparations memory 510, smart phone 210 may provide, to server device 220, an indication 570 indicating that the repartition of memory 510 is complete.

As shown in FIG. 5C, based on indication 570, server device 220 or the personal computer may retrieve the temporarily stored OS information/user data 540, and may provide OS information/user data 540 to smart phone 210. Smart phone 210 may receive OS information/user data 540, and may store OS information/user data 540 in memory 510. For example, smart phone 210 may store the OS information in OS partition 512, and may store the user data in user partition 516. In such an example, a user of smart phone 210 may store additional user content in the increased user partition 516 without having to delete previously stored user content.

As indicated above, FIGS. 5A-5C are provided merely as an example. Other examples are possible and may differ from what was described with regard to FIGS. 5A-5C. In some implementations, the various operations described in connection with FIGS. 5A-5C may be performed automatically or at the request of a user.

Figure 6A:
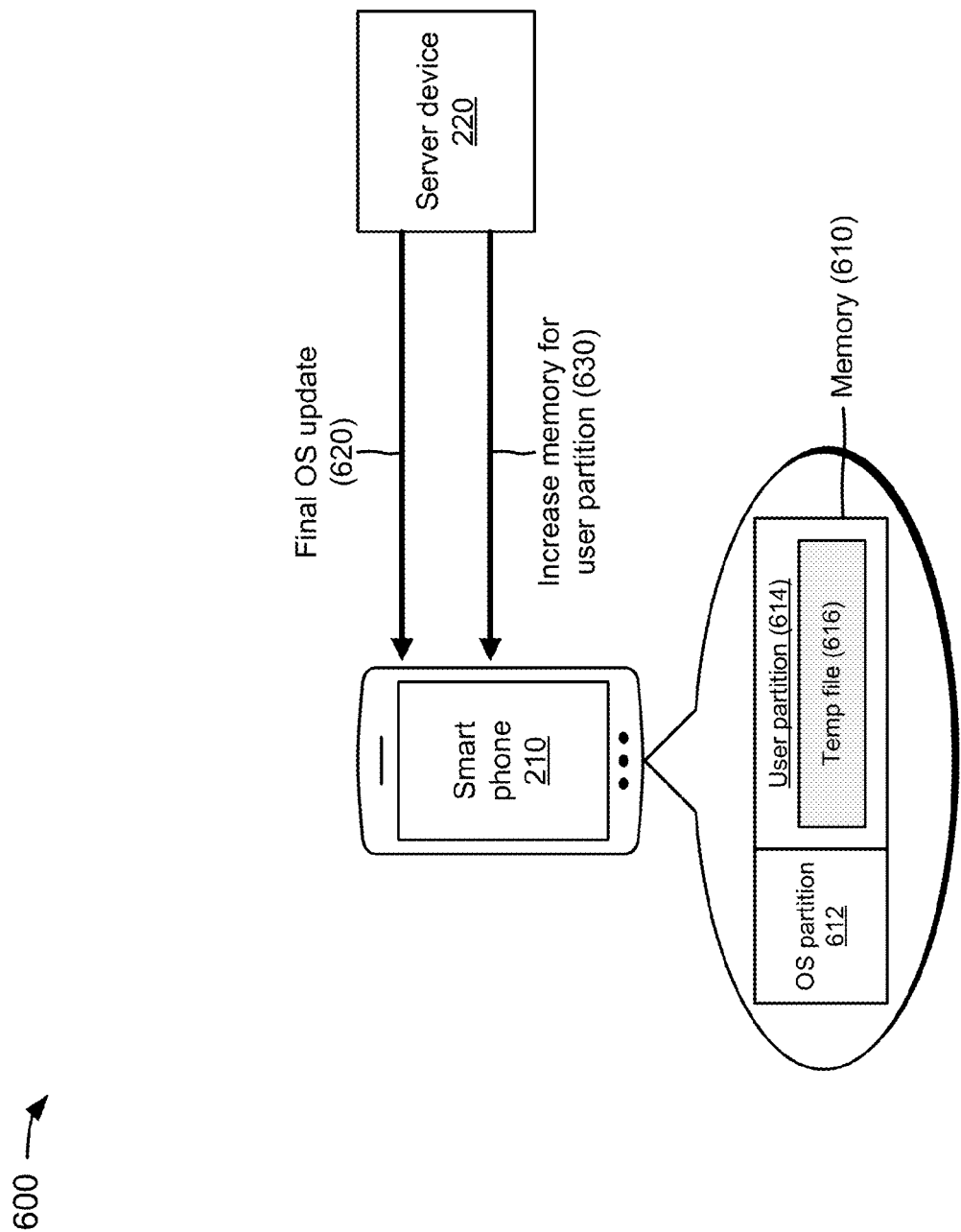
FIGS. 6A and 6B are diagrams of another example relating to the example process shown in FIG. 4.
Figure 6B:
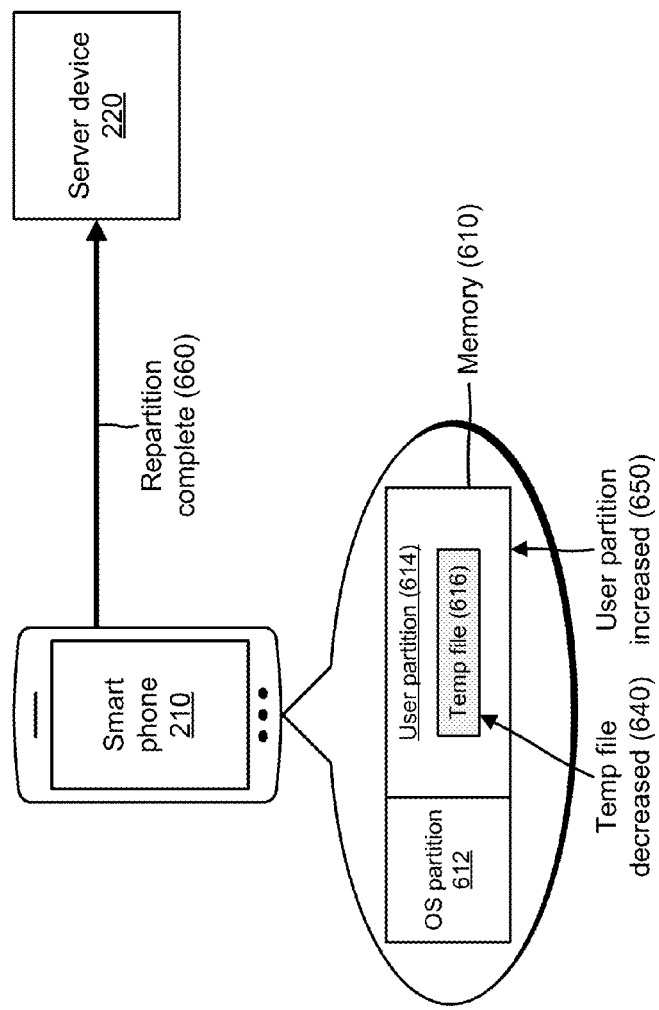

FIGS. 6A and 6B are diagrams of another example 600 relating to example process 400 shown in FIG. 4. As shown in FIG. 6A, assume that mobile user device 210 includes a smart phone, and that smart phone 210 includes a memory 610. Further, assume that memory 610 includes an operating system (OS) partition 612, a user partition 614, and a temporary file 616 hidden in user partition 614. As further shown in FIG. 6A, server device 220 may provide a final operating system (OS) update 620 to smart phone 210. Smart phone 210 may receive final OS update 620, and may store final OS update 620 in place of temporary file 616 (e.g., in user partition 614). In some implementations, smart phone 210 may install final OS update 620, may remove final OS update 620 from user partition 614, and may reinstall temporary file 616 in user partition 616. After providing final OS update 620 to smart phone 210, server device 220 may determine that no future software updates will be provided to smart phone 210. Based on this determination, server device 220 may provide, to smart phone 210, an instruction 630 to increase memory for user partition 614, as further shown in FIG. 6A.

As shown in FIG. 6B and based on instruction 630, smart phone 210 may repartition memory 610 so that storage space allotted to temporary file 616 is decreased by a particular amount, as indicated by reference number 640, and storage space allotted to user partition 614 is increased by the particular amount, as indicated by reference number 650. As further shown in FIG. 6B, after smart phone 210 repartitions memory 610, smart phone 210 may provide, to server device 220, an indication 660 indicating that the repartition of memory 610 is complete. In such an example, the size of user partition 614 may be increased without having to alter user partition 614. Furthermore, a user of smart phone 210 may store additional user content in the increased user partition 614 without having to delete previously stored user content.

As indicated above, FIGS. 6A and 6B are provided merely as an example. Other examples are possible and may differ from what was described with regard to FIGS. 6A and 6B. In some implementations, the various operations described in connection with FIGS. 6A and 6B may be performed automatically or at the request of a user.

Figure 7A:
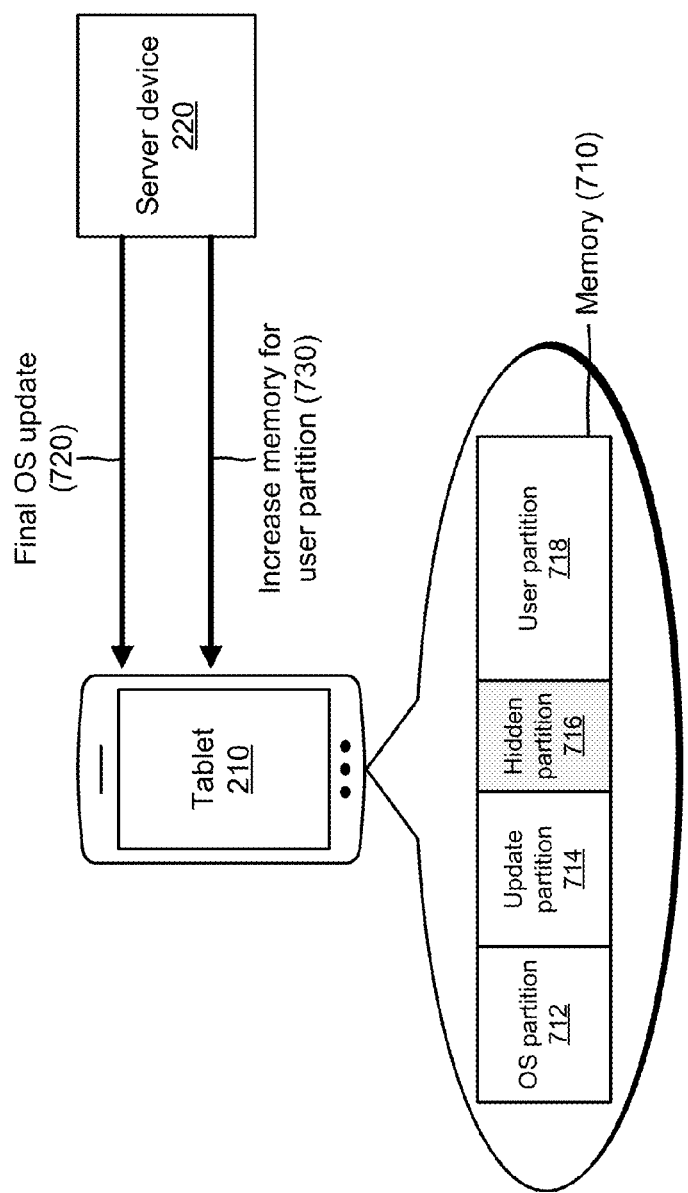
FIGS. 7A and 7B are diagrams of still another example relating to the example process shown in FIG. 4.
Figure 7B:
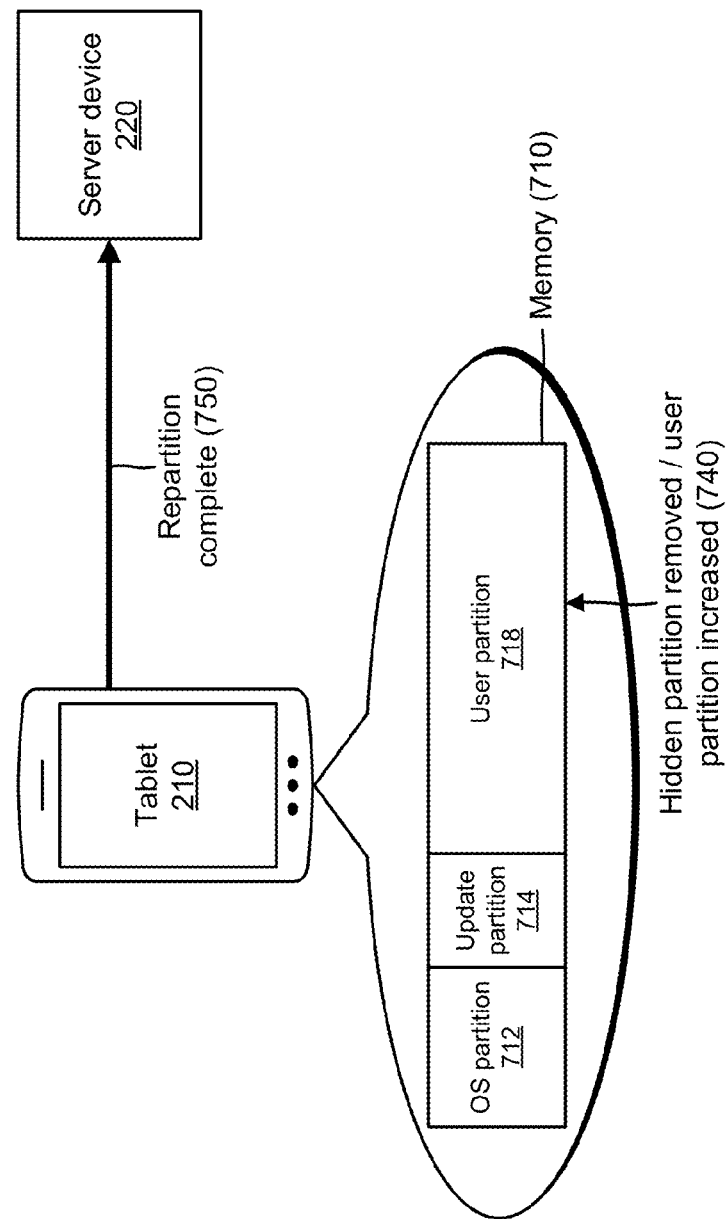

FIGS. 7A and 7B are diagrams of still another example 700 relating to example process 400 shown in FIG. 4. As shown in FIG. 7A, assume that mobile user device 210 includes a tablet computer, and that tablet computer 210 includes a memory 710. Further, assume that memory 710 includes an operating system (OS) partition 712, an update partition 714, a hidden partition 716, and a user partition 718. As further shown in FIG. 7A, server device 220 may provide a final operating system (OS) update 720 to tablet computer 210. Tablet computer 210 may receive final OS update 720, and may store final OS update 720 in update partition 714. In some implementations, tablet computer 210 may install final OS update 720, and may remove final OS update 720 from update partition 714. After providing final OS update 720 to tablet computer 210, server device 220 may determine that no future software updates will be provided to tablet computer 210. Based on this determination, server device 220 may provide, to tablet computer 210, an instruction 730 to increase memory for user partition 718, as further shown in FIG. 7A.

With reference to FIG. 7B and based on instruction 730, tablet computer 210 may repartition memory 710 so that storage space allotted to update partition 714 is decreased by a particular amount, and storage space allotted to hidden partition 716 is increased by the particular amount. Tablet computer 710 may unhide (e.g., remove permissions for) hidden partition 716, and may provide the storage space, allotted to hidden partition 716, to user partition 718 (e.g., to increase user partition 718), as indicated by reference number 740 in FIG. 7B. As further shown in FIG. 7B, after tablet computer 210 repartitions memory 710, tablet computer 210 may provide, to server device 220, an indication 750 indicating that the repartition of memory 710 is complete. In such an example, the size of user partition 614 may be increased without having to alter user partition 718. Furthermore, a user of tablet computer 210 may store additional user content in the increased user partition 718 without having to delete previously stored user content.

As indicated above, FIGS. 7A and 7B are provided merely as an example. Other examples are possible and may differ from what was described with regard to FIGS. 7A and 7B. In some implementations, the various operations described in connection with FIGS. 7A and 7B may be performed automatically or at the request of a user.

Systems and/or methods, described herein, may increase a storage space of a memory of a mobile user device, allotted to user content, after a particular time or a particular event. For example, the systems and/or methods may increase the storage space allotted to user content after the mobile user device is determined to be an end-of-life or obsolete device. The systems and/or methods may increase the storage space allotted to user content when the network service provider ceases sending software updates to the mobile user device. Thus, the systems and/or methods may enable a user to store additional user content on the mobile user device without having to delete previously stored user content to make room for the additional user content.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and prior to repartitioning a memory of a mobile user device, content from the memory of the mobile user device;
   providing, by the device and to the mobile user device, an instruction to increase a first partition of the memory of the mobile user device, based on a determination that the mobile user device will not receive future software updates,
      the first partition of the memory being accessible to a user of the mobile user device, and
      the instruction causing the mobile user device to:
         repartition the memory to decrease a storage space for a second partition of the memory by a particular amount and to increase a storage space for the first partition by the particular amount,
            the second partition of the memory being inaccessible and hidden to the user, and
         generate an indication of performance of the memory repartitioning;
   receiving, by the device, the indication of the performance of the memory repartitioning by the mobile user device; and providing, by the device, the content to the mobile user device when the indication of the performance of the memory repartitioning is received,
the mobile user device storing the content in the repartitioned memory.

2. The method of claim 1, where the determination that the mobile user device will not receive future software updates is made after a particular event occurs or after a particular time occurs.

3. The method of claim 2, where:
the particular event includes when a particular number of software updates are provided to the mobile user device, and
the particular time is based on one of when the mobile user device is purchased, when the mobile user device is available for sale, or when the mobile user device is used with a network.

4. The method of claim 1, where the instruction further causes the mobile user device to provide the content to a cloud computing device or to a computing device connected to the mobile user device.

5. The method of claim 1, further comprising:
providing, to the mobile user device prior to receiving the content from the memory, a user interface that includes an option to accept or deny the memory repartitioning.

6. A device, comprising:
one or more processors to:
receive, prior to increasing a partition of a memory of a mobile user device, content from the memory of the mobile user device;
provide, to the mobile user device, an instruction to increase the partition of the memory of the mobile user device, based on a determination that the mobile user device will not receive future software updates,
the partition of the memory being accessible to a user of the mobile user device, and
the instruction causing the mobile user device to:
increase a storage space for the partition by a particular amount, and
generate an indication of the increased partition;
receive the indication of the increased partition; and
provide the content to the mobile user device when the indication of the increased partition is received,
the mobile user device storing the content in the memory.

7. The device of claim 6, where the determination that the mobile user device will not receive future software updates is made after a particular event occurs or after a particular amount of time expires.

8. The device of claim 7, where:
the particular event includes when a particular number of operating system updates are provided to the mobile user device, and
the particular amount of time includes an amount of time after a purchase or use of the mobile user device.

9. The device of claim 6, where the instruction causes the mobile user device to provide the content to a cloud computing device or to a computing device connected to the mobile user device.

10. The device of claim 6, where the one or more processors are further to:
provide, to the mobile user device and prior to receiving the content from the memory, a user interface that includes an option to accept or deny the increasing to the partition of the memory.

11. A method, comprising:
providing, by a mobile user device and to a device prior to repartitioning a memory of the mobile user device, content from the memory of the mobile user device;
receiving, by the mobile user device and from the device, an instruction to increase a partition of the memory of the mobile user device,
the partition of the memory being accessible to a user of the mobile user device;
repartitioning, by the mobile user device and based on the instruction, the memory to increase a storage space for the partition by a particular amount;
generating, by the mobile user device, an indication that the memory repartitioning has been performed;
providing, by the mobile user device, the indication to the device;
receiving, by the mobile user device and from the device, the content based on providing the indication to the device; and
storing the content in the repartitioned memory.

12. The method of claim 11, where repartitioning the memory comprises:
decreasing a storage space for another partition of the memory by the particular amount,
the other partition of the memory being inaccessible and hidden to the user; and
increasing the storage space for the partition by the particular amount based on decreasing the storage space for the other partition.

13. The method of claim 11, where repartitioning the memory comprises:
decreasing a storage space for a temporary file, provided in the partition, by the particular amount; and
increasing the storage space for the partition based on decreasing the storage space for the temporary file.

14. The method of claim 11, where repartitioning the memory comprises:
making a hidden partition of the memory accessible to the user, and
adding the hidden partition to the partition in order to increase the storage space for the partition by the particular amount.

15. The method of claim 11, further comprising:
displaying, prior to providing the content from the memory, a user interface that includes an option to accept or deny the repartition of the memory.

16. A mobile user device, comprising:
a memory including a partition that is accessible to a user of the mobile user device; and
one or more processors to:
provide, to a device and prior to increasing a storage space for the partition, content from the memory of the mobile user device;
receive, from the device, an instruction to increase the storage space of the partition,
the instruction being included with a final software update provided by the device to the mobile user device;
increase the storage space for the partition by a particular amount, based on the instruction;
generate an indication of the increased storage space of the partition;
provide the indication to the device;
receive the content, from the device, based on providing the indication to the device; and
store the content in the memory.

17. The mobile user device of claim 16, where, the memory further includes another partition that is inaccessible and hidden to the user, and
when increasing the storage space for the partition, the one or more processors are further to:
decrease a storage space for the other partition by the particular amount; and
increase the storage space for the partition by the particular amount based on decreasing the storage space for the other partition.

18. The mobile user device of claim 16, where, when increasing the storage space for the partition, the one or more processors are further to:
decrease a storage space for a temporary file, provided in the partition, by the particular amount; and
increase the storage space for the partition by the particular amount based on decreasing the storage space for the temporary file.

19. The mobile user device of claim 16, where, the memory further includes a second partition and a third partition,
the second partition and the third partition being inaccessible to the user, and
the third partition including a storage space of a first amount; and
when increasing the storage space for the partition, the one or more processors are further to:
decrease a storage space for the second partition by a second amount;
increase the storage space for the third partition by the second amount,
a sum of the first amount and the second amount being equivalent to the particular amount;
make third partition accessible to the user; and
add the third partition to the partition in order to increase the storage space for the partition by the particular amount.

20. The mobile user device of claim 16, where the one or more processors are further to:
display, prior to providing the content from the memory, a user interface that includes an option to accept or deny the increasing of the storage space for the partition.

* * * * *